United States Patent
Sobieski et al.

(10) Patent No.: US 6,886,346 B2
(45) Date of Patent: May 3, 2005

(54) GAS TURBINE FUEL PILOT NOZZLE

(75) Inventors: Peter A. Sobieski, El Lago, TX (US);
Kelly Shawn Smith, Kingwood, TX (US); Alan Lovelace, Kingwood, TX (US); Hany Rizkalla, Stuart, FL (US)

(73) Assignee: Power Systems Mfg., LLC, Jupiter, FL (US)

( * ) Notice: Subject to any disclaimer, the term of this patent is extended or adjusted under 35 U.S.C. 154(b) by 51 days.

(21) Appl. No.: 10/644,385

(22) Filed: Aug. 20, 2003

(65) Prior Publication Data

US 2005/0039460 A1 Feb. 24, 2005

(51) Int. Cl.⁷ ................................................ F02C 7/22
(52) U.S. Cl. ....................................... 60/776; 60/740
(58) Field of Search ........................ 60/776, 740, 748, 60/756, 738, 737, 725

(56) References Cited

U.S. PATENT DOCUMENTS

| | | | |
|---|---|---|---|
| 3,447,757 A * | 6/1969 | Roberts et al. ............. | 239/597 |
| 5,685,139 A * | 11/1997 | Mick et al. .................. | 60/776 |
| 6,038,862 A | 3/2000 | Melman et al. | |
| 2003/0217556 A1 * | 11/2003 | Wiebe ......................... | 60/796 |
| 2004/0045295 A1 * | 3/2004 | Wiebe et al. ................. | 60/737 |
| 2004/0177615 A1 * | 9/2004 | Martling ...................... | 60/740 |
| 2004/0237531 A1 * | 12/2004 | Hirasaki ...................... | 60/740 |

* cited by examiner

Primary Examiner—Ehud Gartenberg
(74) Attorney, Agent, or Firm—Brian R. Mack

(57) ABSTRACT

A pilot fuel nozzle configuration for use in a combustor is disclosed having a natural frequency outside the range of the operating frequencies of a gas turbine engine. Multiple embodiments are disclosed for the improved pilot fuel nozzle including configurations for newly manufactured nozzles, repair to existing pilot nozzles, as well as multiple natural frequency levels for the improved pilot fuel nozzle. The pilot fuel nozzle comprises an elongated housing, first and second flanges, and a nozzle tip, with the first flange fixed to the elongated housing at a first end and the nozzle tip fixed to the second end, opposite of the first end. The second flange is fixed along the elongated housing and is used for attaching the pilot fuel nozzle to a combustor. The present invention incorporates an increased wall thickness along at least a mid-span portion of the pilot nozzle to increase the stiffness and change the natural frequency.

12 Claims, 4 Drawing Sheets

US 6,886,346 B2

GAS TURBINE FUEL PILOT NOZZLE

TECHNICAL FIELD

This invention relates to a pilot fuel nozzle for a gas turbine combustor and more specifically to a particular nozzle structure having an altered natural frequency and a method for altering the natural frequency of a pilot fuel nozzle.

BACKGROUND OF THE INVENTION

A gas turbine engine contains a compressor in fluid communication with a combustion system, where the combustion system often contains a plurality of combustors arranged about the engine. The compressor raises the pressure of the air passing through each stage of the compressor and directs it to the combustors where fuel is injected and mixed with the compressed air. The fuel and air mixture ignites and combusts creating a flow of hot gases that are then directed into the turbine. The hot gases drive the turbine, which in turn drives the compressor, and for electrical generation purposes, also drives a generator.

Most combustion systems utilize a plurality of fuel injectors for staging, emissions purposes, and flame stability. A common practice to ensure flame stability is to employ a pilot fuel nozzle whose main purpose is to supply a rich fuel stream to the combustion zone. An example of a pilot fuel nozzle of the prior art is shown in FIG. 1. A combustor 10 contains a liner 11 having a combustion zone 12, and is enclosed by an end cover 13, where end cover 13 includes a pilot fuel nozzle 14 and a plurality of main fuel nozzles 15 arranged in a radial array about pilot fuel nozzle 14. Pilot fuel nozzle 14 is generally tubular in shape having a first outer diameter 16 and a first inner diameter 17 throughout, thereby forming a wall thickness 17A. Fixed to pilot fuel nozzle 14 is a nozzle tip 18 having a plurality of fuel injection holes (not shown) for injecting a fuel from pilot fuel nozzle 14 into combustion zone 12.

Pilot fuel nozzle 14 is fixed to end cover 13, cantilevered from flange 19. Field experience with a pilot fuel nozzle of the configuration shown in FIG. 1 includes severe fractures that have liberated portions of nozzle 14 causing significant damage to the combustor and turbine sections of the engine, forcing engine shutdown and extensive repairs.

Prior art fuel nozzles have incorporated devices such, as the one shown in U.S. Pat. No. 6,038,862, to address the issue of high cycle fatigue. Unfortunately, this device cannot be readily applied to a fuel nozzle comprised of a single tube cantilevered in a combustor since the fuel nozzle structure is not configured to utilize a damper. A cost effective alternate means to address this problem is necessary.

The present invention seeks to overcome the shortfalls of the prior art pilot fuel nozzle configuration by providing a pilot fuel nozzle structure that has a natural frequency well outside of a known operating range of the gas turbine engine such that cracks and fractures due to resonance are avoided and potential damage to the combustor and turbine sections are minimized. A cost effective method for changing the natural frequency of existing pilot fuel nozzles is also disclosed such that existing pilot fuel nozzles can be reconfigured, thereby avoiding scrap hardware.

SUMMARY AND OBJECTS OF THE INVENTION

According to the present invention, a pilot fuel nozzle configuration is disclosed having a natural frequency sufficiently outside the range of the operating frequencies of a gas turbine engine to avoid resonance. Multiple embodiments of the present invention are disclosed depending on whether the pilot fuel nozzle is newly manufactured, is a repair to an existing pilot nozzle, or depending on the desired natural frequency for the pilot nozzle. The pilot fuel nozzle includes an elongated housing, first and second flanges, and a nozzle tip, with the first flange fixed to the elongated housing at a first end and the nozzle tip fixed to the second end, opposite of the first end. The second flange is fixed along the elongated housing and is used for attaching the pilot fuel nozzle to a combustor. The present invention incorporates an increased wall thickness along at least a mid-span portion of the pilot nozzle to increase the stiffness and change the natural frequency.

It is an object of the present invention to provide a pilot fuel nozzle having a natural frequency sufficiently out of the range of an operating frequency of a gas turbine engine such that resonance and potentially damaging cracks to the pilot nozzle are avoided.

It is another object of the present invention to provide a means to alter the natural frequency of an existing pilot nozzle.

In accordance with these and other objects, which will become apparent hereinafter, the instant invention will now be described with particular reference to the accompanying drawings.

DETAILED DESCRIPTION OF THE PREFERRED EMBODIMENT

Figure 2:
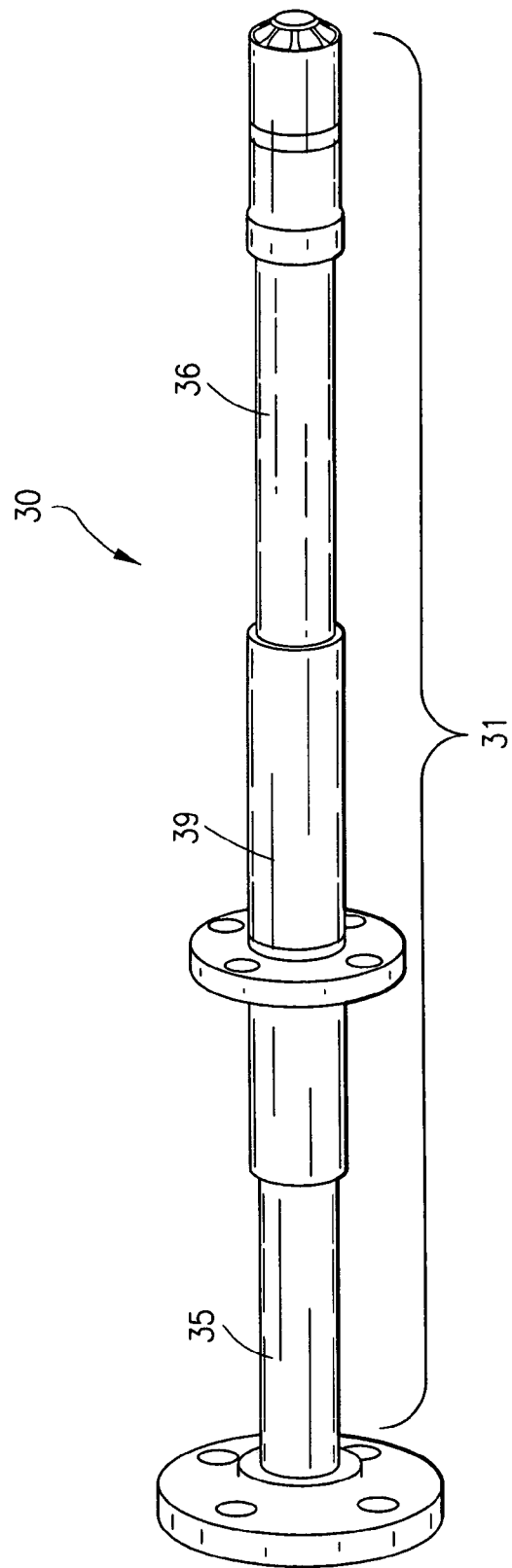
FIG. 2 is a perspective view of a pilot fuel nozzle in accordance with the preferred embodiment of the present invention.
Figure 3:
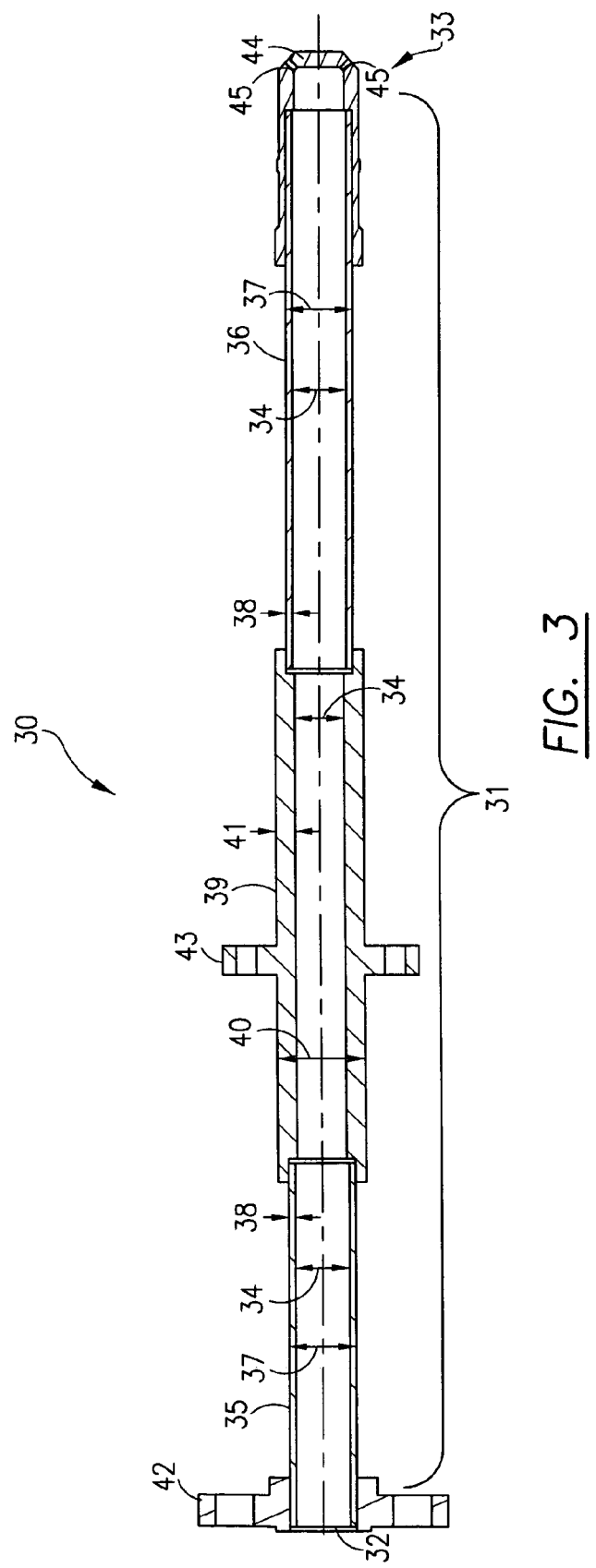
FIG. 3 is a cross section view of a pilot fuel nozzle in accordance with the preferred embodiment of the present invention.

The preferred embodiment of the present invention is shown in detail in FIGS. 2 and 3. A pilot fuel nozzle 30 for use in a gas turbine combustor comprises an elongated housing 31 generally circular in cross section, with housing 31 extending from a first end 32 to a second end 33. Elongated housing has a center axis, a length, and a first inner diameter 34, each of which extend from first end 32 to second end 33. In the preferred embodiment, elongated housing 31 comprises three portions. First portion 35 and second portion 36 each have a first outer diameter 37, thereby forming a first wall thickness 38 between first inner diameter 34 and first outer diameter 37. Located inbetween first portion 35 and second portion 36 is a third portion 39 having a second outer diameter 40, and thereby forming a second wall thickness 41 between first inner diameter 34 and second outer diameter 40. Pilot fuel nozzle 30 further comprises a plurality of flanges for connecting the nozzle to a fuel source and to a combustor. A first flange 42 is fixed to elongated housing 31 at first end 32 while a second flange 43 is fixed, in the preferred embodiment, to elongated housing 31 along third portion 39. Located at second end 33 is a nozzle tip 44 that contains a plurality of fuel injection holes 45 for injecting a fuel contained within a passage that is formed by first diameter 34, into a combustion chamber. Preferably nozzle tip 44 contains at least three fuel injection holes.

Figure 1:
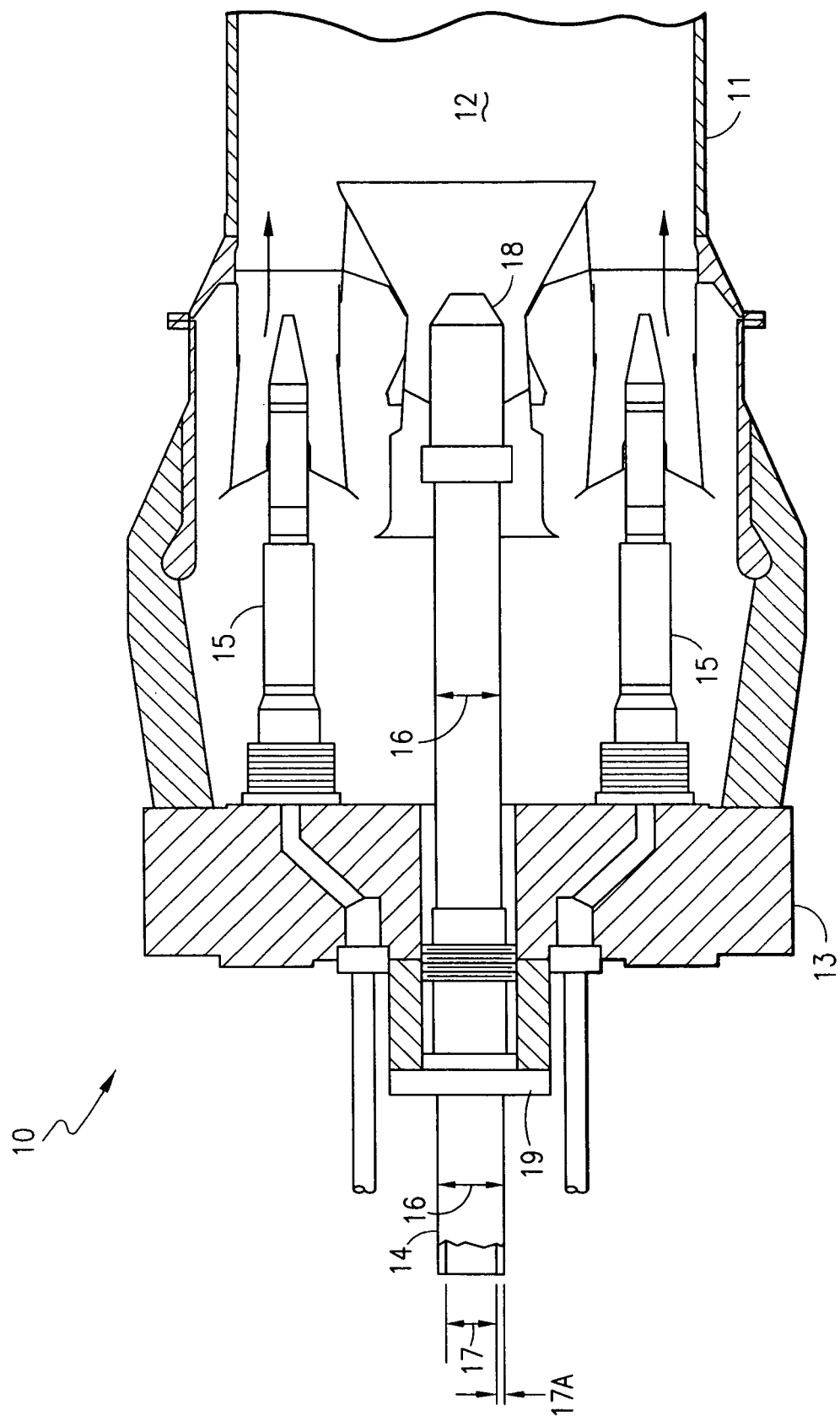
FIG. 1 is a cross section view of a combustor containing a pilot fuel nozzle of the prior art.

Typically, the fuel nozzle disclosed in FIGS. 2 and 3 is mounted in a cantilevered fashion to a combustor at second flange 43 with first flange 42 rigidly fixed to a fuel supply source. Therefore, a part of third portion 39 and all of second portion 36 between second flange 43 and nozzle tip 44 are free to vibrate. However, in this configuration, and unlike the prior art pilot fuel nozzle shown in FIG. 1, pilot fuel nozzle 30 is stiffer, thereby raising the natural frequency. This is due to the fact that second outer diameter 40 is greater than first outer diameter 37, while maintaining a constant inner diameter 34. For example, in the preferred embodiment, second outer diameter 40 has been increased such that second wall thickness 41 is increased from 0.158 inches to 0.382 inches. Due to the local thickness increase along third portion 39, the natural frequency of the pilot fuel nozzle 30 increased from 133 Hz to 192 Hz, well outside the engine operating frequency of 130 Hz.

In the preferred embodiment of the present invention, elongated housing 31 of pilot fuel nozzle 30 is shown to be constructed from multiple tubes, fixed together by a means such as brazing or welding. However one skilled in the art of fuel nozzle manufacturing will understand that first portion 35, second portion 36, and third portion 39 which comprise elongated housing 31 can be constructed from a single piece of tubing with the respective outer diameters machined to the desired size.

Figure 4:
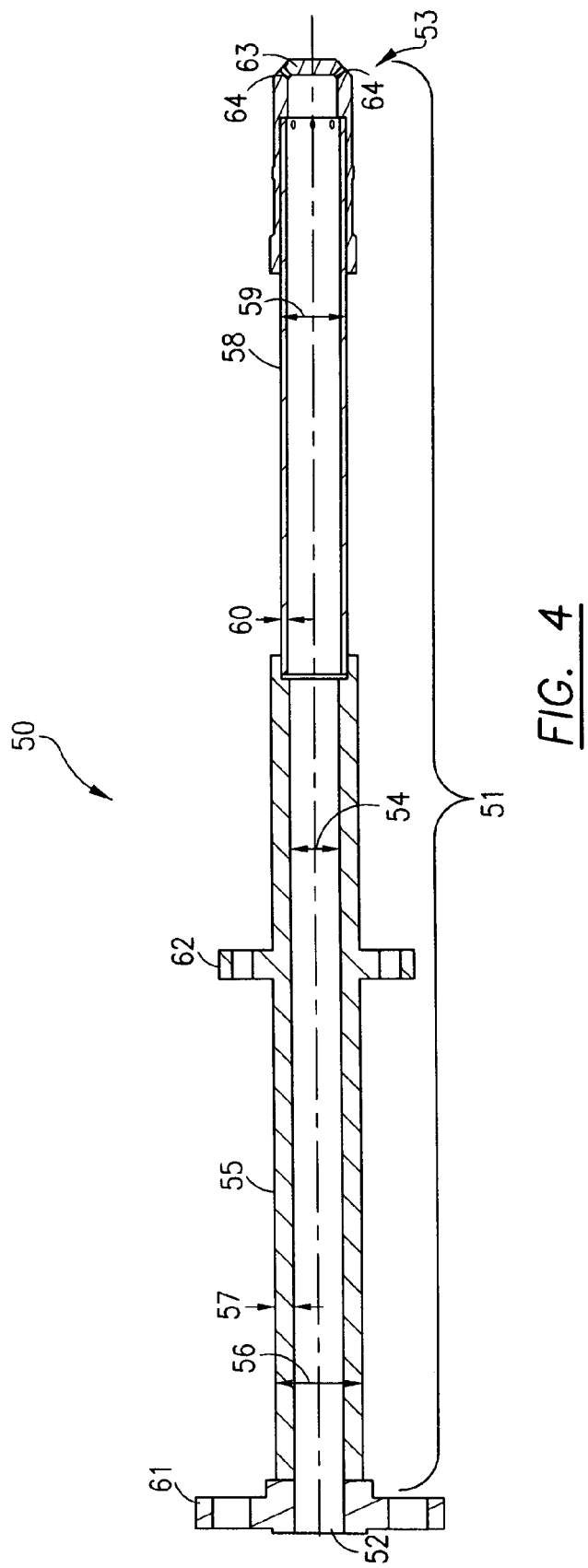
FIG. 4 is a cross section view of a pilot fuel nozzle in accordance with an alternate embodiment of the present invention.

An alternate embodiment of the present invention is disclosed that provides a pilot fuel nozzle with an even higher natural frequency than the preferred embodiment while simplifying the manufacturing process. Referring to FIG. 4, pilot fuel nozzle 50 comprises an elongated housing 51 having a generally circular cross section extending from a first end 52 to a second end 53. Elongated housing 51 has a center axis, a length, and a first inner diameter 54 each of which extend from first end 52 to second end 53. In this alternate embodiment, elongated housing 51 comprises two portions. First portion 55, which extends over at least half of the length of elongated housing 51, has a first outer diameter 56, thereby forming a first wall thickness 57 between first inner diameter 54 and first outer diameter 56. A second portion 58 has a second outer diameter 59 thereby forming a second wall thickness 60 between first inner diameter 54 and second outer diameter 59. Pilot fuel nozzle 50 further comprises a plurality of flanges for connecting the nozzle to a fuel source and to a combustor. A first flange 61 is fixed to elongated housing 51 at first end 52, while a second flange 62 is fixed to elongated housing 51 along first portion 55. Located at second end 53 is a nozzle tip 63 that contains a plurality of fuel injection holes 64 for injecting a fuel contained within a passage that is formed by first diameter 54, into a combustion chamber. Preferably nozzle tip 63 contains at least three fuel injection holes. In order to further raise the overall natural frequency of pilot fuel nozzle 50, first outer diameter 56 of first portion 55 is greater than second outer diameter 59 of second portion 58 over the entire length of first portion 55, thereby increasing the stiffness. In this embodiment, first wall thickness 57 is increased to 0.382 inches from 0.158 inches as in the prior art pilot fuel nozzle. As a result, the natural frequency of pilot fuel nozzle 50 is raised to 225 Hz, even further away from the engine operating frequency of 130 Hz. A larger outer diameter with the same inner diameter increases the wall thickness and stiffness of the first portion, thereby raising the frequency of that portion. One skilled in the art of fuel nozzle manufacturing will understand that elongated housing 51 can be formed from a single tubular body or that first portion 55 and second portion 58 can be formed from multiple tubes fixed together.

A further disclosure of the present invention is a method of changing the natural frequency of a pilot fuel nozzle. While gas turbine operators would like to purchase new improved pilot fuel nozzles, financially that is not always a viable alternative. Combustion hardware typically has an operating life of approximately 48,000 hours, and depending on the amount of time the engine is operated per year, that could mean a significant amount of time before replacing the fuel nozzles is required. So, in order to eliminate a potentially catastrophic failure of a pilot fuel nozzle while maximizing the nozzle life, steps can be taken to modify the prior art pilot fuel nozzle to the configuration disclosed in the present invention.

A pilot fuel nozzle is provided having a generally circular cross section extending from a first end to a second end, having a center axis, a length, and a first inner diameter extending from the first end to the second end. The pilot fuel nozzle has a first portion and a second portion, each having a first outer diameter, thereby forming a first wall thickness between the first inner diameter and the first outer diameter. Furthermore, a first flange is fixed to the first end of the elongated housing, a second flange is fixed to the elongated housing along a mid-span region of the second portion, and a nozzle tip is located at the second end containing a plurality of fuel injection holes. The mid-span region of the second portion of the elongated housing including the second flange is then removed. Next, a third portion of elongated housing is inserted between the first portion and the remaining second portion. The third portion has a second flange, a first inner diameter, and a second outer diameter, thereby forming a second thickness between the first inner diameter and second outer diameter, with the second outer diameter greater than the first outer diameter, such that the second thickness is greater than the first thickness. The third portion is fixed to the first portion and the second portion by a means such as welding or brazing to form a new elongated housing having an increased stiffness and a natural frequency outside of the operating modes of a gas turbine engine. For repair and replacement purposes, first portion, second portion, and third portion are formed from multiple tubes fixed by a means such as welding or brazing, whereas for new pilot fuel nozzle construction, first, second, and third portions could be formed from a single piece of tubing.

While the invention has been described in what is known as presently the preferred embodiment, it is to be understood that the invention is not to be limited to the disclosed embodiment but, on the contrary, is intended to cover various modifications and equivalent arrangements within the scope of the following claims.

What we claim is:

1. A pilot fuel nozzle for a gas turbine combustor comprising:
   an elongated housing of generally circular cross section extending from a first end to a second end, having a center axis, and a length, said elongated housing comprising:
      a first inner diameter extending from said first end to said second end;
      a first portion and a second portion, each having a first outer diameter, thereby forming a first wall thickness between said first inner diameter and said first outer diameter;

a third portion having a second outer diameter, thereby forming a second wall thickness between said first inner diameter and said second outer diameter;

a first flange fixed to said elongated housing at said first end;

a second flange fixed to said elongated housing along said third portion;

a nozzle tip containing a plurality of fuel injection holes, said nozzle tip located at said second end; and, wherein said third portion is located between said first portion and said second portion.

2. The pilot fuel nozzle of claim 1 wherein said second outer diameter is greater than said first outer diameter.

3. The pilot fuel nozzle of claim 1 wherein said plurality of fuel injection holes comprises at least three holes.

4. The pilot fuel nozzle of claim 1 wherein said first portion, said second portion, and said third portion are formed from multiple tubes fixed together to form said elongated housing.

5. The pilot fuel nozzle of claim 1 wherein said first portion, said second portion, and said third portion are formed from a single piece of tubing.

6. A pilot fuel nozzle for a gas turbine combustor comprising:

an elongated housing of generally circular cross section extending from a first end to a second end, having a center axis, and a length, said elongated housing comprising:

a first inner diameter extending from said first end to said second end;

a first portion having a first outer diameter, thereby forming a first wall thickness between said first inner diameter and said first outer diameter;

a second portion having a second outer diameter, thereby forming a second wall thickness between said first inner diameter and said second outer diameter;

a first flange fixed to said elongated housing at said first end;

a second flange fixed to said elongated housing at approximately a mid-span location of said first portion;

a nozzle tip containing a plurality of fuel injection holes, said nozzle tip located at said second end; and, wherein said first portion extends at least 50% of said length of said elongated housing.

7. The pilot fuel nozzle of claim 6 wherein said first outer diameter is greater than said second outer diameter.

8. The pilot fuel nozzle of claim 6 wherein said elongated housing is formed from a single tubular body.

9. The pilot fuel nozzle of claim 6 wherein said first portion and second portion are formed from multiple tubes fixed together to form said elongated housing.

10. The pilot fuel nozzle of claim 6 wherein said plurality of fuel injection holes comprises at least three holes.

11. The method of changing the natural frequency of gas turbine combustor pilot fuel nozzle comprising the steps:

a) providing a pilot fuel nozzle of generally circular cross section extending from a first end to a second end, having a center axis, a length, a first inner diameter extending from said first end to said second end, a first portion and second portion having a first outer diameter, thereby forming a first wall thickness between said first inner diameter and said first outer diameter, a first flange fixed to said first end of said elongated housing, a second flange fixed to said elongated housing along a mid-span region of said second portion, and a nozzle tip containing a plurality of fuel injection holes, said nozzle tip located at said second end;

b) removing said mid-span region of said second portion of said elongated housing including said second flange;

c) inserting a third portion of elongated housing between said first portion and said second portion, said third portion having a second flange, a first inner diameter, and a second outer diameter, thereby forming a second thickness between said first inner diameter and said second outer diameter, wherein said second outer diameter is greater than said first outer diameter and said second thickness is greater than said first thickness; and, d) fixing said third portion to said first portion and said second portion.

12. The method of claim 11 wherein said first portion, said second portion, and said third portion of said pilot fuel nozzle are formed from multiple tubes fixed together.

* * * * *